Oct. 12, 1937.   R. F. PEO   2,095,711
CONNECTING LINK
Filed Aug. 8, 1935
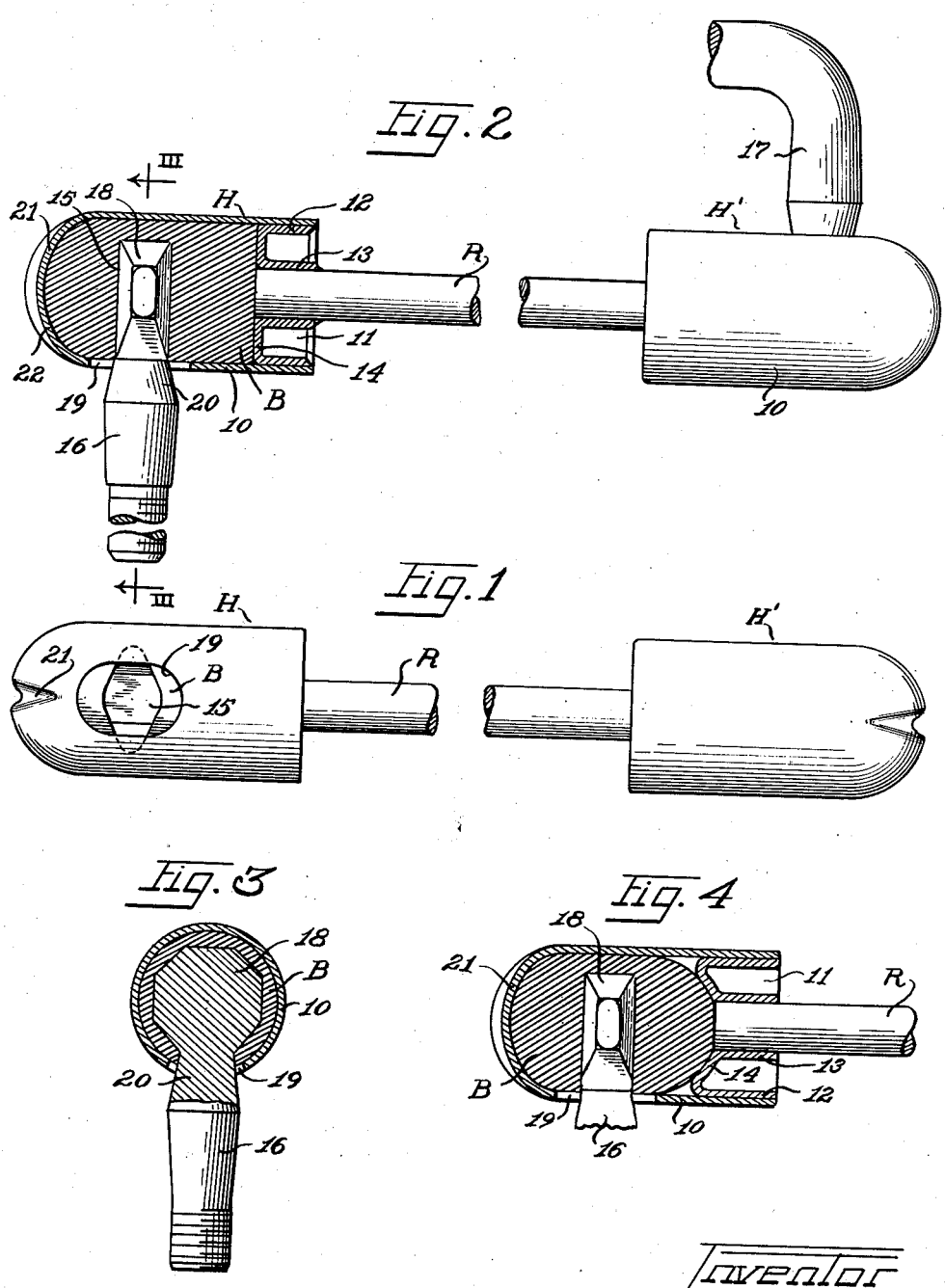
Inventor
Ralph F. Peo
by Charles Hill Attys Patented Oct. 12, 1937

2,095,711

UNITED STATES PATENT OFFICE 2,095,711

CONNECTING LINK

Ralph F. Peo, Buffalo, N. Y., assignor to Houde Engineering Corporation, Buffalo, N. Y., a corporation of New York Application August 8, 1935, Serial No. 35,245

5 Claims. (Cl. 287—85)

My invention relates to connecting links adapted particularly for service in automotive vehicles as for example for connecting the axle with the lever arm of a shock absorber mounted on the vehicle chassis body.

My improved link is of the type in which housings at the end of a rod contain bushings of resilient material such as rubber in which studs which are to be connected are embedded so as to form a resilient joint which is noiseless and does not require lubrication nor adjustment.

An important object of the invention is to provide elongated cylindrical cup shaped housings drawn integral from sheet metal and closed at their open ends by walls welded thereto and between which the connecting rod or shank extends and is preferably secured by welding to the walls.

A further object is to provide an arrangement in which the end walls of the housing cups are inserted under pressure to give the bushings within the housing the required compression fitting, securing or welding of the walls being accomplished during the pressure operation so that upon release of the pressure the bushings will be under the required compression.

Another object of the invention is to provide simple means for preventing rotational displacement of a bushing in its housing so that its stud receiving cavity will be maintained in proper position relative to the opening in the housing through which the stud extends.

The above enumerated and other features of my invention are incorporated in the structure disclosed on the accompanying drawing, in which drawing Figure 1 is a side elevation of the link;

Figure 2 is a side elevation of the link and connected studs and with one of the link heads in longitudinal section;

Figure 3 is a section on plane III—III in Figure 2; and

Figure 4 is the section of one of the heads showing a modified arrangement.

The connecting link structure shown comprises heads H and H' and a rod or shank R secured to and connecting the heads. Each head comprises a housing body 10 in the form of an elongated cylindrical cup preferably drawn from suitable sheet metal such as steel. In the open end of each housing cup is secured an annular wall structure 11 preferably of U-shape cross-section to provide outer and inner annular walls or flanges 12 and 13 and a transverse wall 14, the annular walls extending outwardly. The wall structure may be drawn from sheet metal and it is secured in place in the end of the housing preferably by welding the wall flange 12 to the housing by any suitable welding process.

The inner flanges 13 of the end walls receive the end of the rod or shank R and the rod is rigidly secured preferably by welding the flanges 13 thereto in any suitable manner.

The chamber formed in each head by the housing cup and its end wall 11 is filled by a bushing B of resilient material such as rubber, the bushing being integrally molded. Each bushing has a cavity 15 intermediate its ends extending transversely therein from one side thereof and shaped in accordance with the end of a stud which it is to receive and to which stud the link is to be connected. The studs or arms 16 and 17 shown have flat ends 18 of hexagonal contour and therefore the cavities 15 in the bushings are of similar shape.

Each housing cup has an opening 19 in one side thereof elongated in a direction parallel with the housing axis and the elongated opening registering with and crossing the mouth of the cavity in the bushing, the plane of such cavity being at right angles with the longitudinal axis of the bushing so that the cavity extends transversely of the elongated opening in the housing cup. The neck 20 of the stud at the base of the flat or spade end 18 is of a width slightly less than the minor axis of the elongated opening 19 and the maximum width of the end 18 is slightly less than the length of the major axis of the opening 19. With this arrangement connection between the finished link structure and a stud can be readily accomplished. The link and a stud are first brought into relative position for reception of the end 18 through the opening 19 whereupon, by the exertion of pressure, the tapered front edge of the end 18 may be forced into the bushing cavity 15 by displacement of the rubber and then the stud and link are relatively turned until the flat stud end accurately seats in the correspondingly shaped cavity, and the resilient joint will be completed, the flat end then extending crosswise of the housing cup opening 19 and being thereby locked against displacement through the opening.

In order that the resilient bushings may snugly hold the socket and the stud ends, the bushings are preferably under compression. Such compression can be readily introduced when the end wall structures 11 are secured in the housing cups. The end wall structures are first welded to the rod R, and then after insertion of the bushing material into the housing cups, the end wall structures 11 are inserted and the assembled structure put under axial pressure until the bushings have been properly compressed and then electric welding current is applied for welding of the end wall structures to the housing cups.

In order to prevent rotational displacement of the bushings and to keep the bushing cavities in proper alignment with the housing openings, the bottoms of the housing cups are indented to provide keys or lugs 21 which receive the indentations 22 molded into the ends of the bushings. As shown the bottoms of the housing cups are semi-spherical and the lugs may extend transversely thereacross to afford sufficient engagement area with the bushings to prevent rotational displacement thereof.

The end wall structures 11 may be concave on their inner sides so that the bushings will be of egg shape, as shown in Figure 4, or these walls may be flat on their inner sides as shown in Figure 2.

My improved connecting link may be very economically manufactured and it is of light weight yet of great strength and rigidity.

I have shown and described a practical and efficient embodiment of the various features of my invention but I do not desire to be limited to the exact construction, arrangement and operation shown and described as changes and modifications may be made without departing from the scope of the invention.

I claim as follows:

1. In connection structure of the class described, a connection head in the form of a housing, a connecting rod secured to the housing, said housing having a side opening, a bushing of resilient material compressed in said housing and having a cavity in alignment with said housing opening for the reception of a stud to be connected, and said housing having an indented portion cooperating with the bushing to prevent displacement thereof and to maintain its cavity in proper alignment with the housing opening.

2. In link structure of the class described, a head in the form of a sheet metal cup, an end wall secured in said cup and a connecting rod extending therefrom, said cup having a side opening, a bushing of resilient material compressed in said cup and having a cavity aligned with the cup opening to receive the end of a member to be connected, the bottom of the cup being indented inwardly to form a key, and a groove in the bushing receiving the key whereby rotary displacement of the bushing will be prevented.

3. In connecting link structure of the class described, a head comprising a cylindrical one-piece metal cup and a cross wall structure in the mouth thereof, said cross wall structure being annular and of U-shaped cross-section to provide outer and inner annular flanges, said cross wall structure being secured by welding of its outer flange to the cup, a connecting rod received by the inner flange of the cross wall and welded thereto, said cup having a side opening, a bushing of resilient material filling said cup and having a cavity in alignment with said cup opening for the reception of the end of a member to be connected, and means on said cup engaging said bushing to prevent rotational displacement thereof.

4. In link structure of the class described, a head comprising a one-piece metal cup and an annular closure wall in the mouth of the cup having a U-shaped cross section to provide inner and outer flanges, a bushing of resilient material in the cup, said closure wall being applied with pressure against the bushing to compress the same and being then welded along its outer flange to the cup, a connecting rod extending from the closure wall and welded to the inner flange, said cup having an opening and said bushing having a cavity in registration therewith for receiving the end of a member to be connected and inserted through the cup opening.

5. In a link, a cup-shaped housing, an end wall closing the open end of the cup-shaped housing, a connecting rod extending from the end wall, said housing having an opening therethrough, a rubber bushing in said housing having a formed cavity therein aligned with the opening of the housing to receive the head of a stud therein, a portion of said housing and a portion of said bushing being in key and slot relation with each other to maintain the bushing cavity in alignment with the opening.

RALPH F. PEO.